(12) United States Patent
Ward

(10) Patent No.: US 9,147,544 B2
(45) Date of Patent: Sep. 29, 2015

(54) ELECTROMECHANICAL SWITCHING CIRCUIT WITH MEMORY

(71) Applicant: Shakira Limited, Ballinasloe (IE)

(72) Inventor: Patrick Ward, Ballinasloe (IE)

(73) Assignee: Shakira Limited, Ballinasloe (IE)

( * ) Notice: Subject to any disclaimer, the term of this patent is extended or adjusted under 35 U.S.C. 154(b) by 68 days.

(21) Appl. No.: 14/027,348

(22) Filed: Sep. 16, 2013

(65) Prior Publication Data

US 2014/0111891 A1    Apr. 24, 2014

(30) Foreign Application Priority Data

Oct. 23, 2012    (IE) .................................. S2012/0467

(51) Int. Cl.
*H01H 47/22*    (2006.01)
*H01H 47/04*    (2006.01)
*H02H 1/00*    (2006.01)

(52) U.S. Cl.
CPC ............. *H01H 47/22* (2013.01); *H01H 47/043* (2013.01); *H02H 1/0015* (2013.01)

(58) Field of Classification Search
CPC ............................... H02H 3/162; H01H 47/22
USPC .............................................. 361/42, 115, 190
See application file for complete search history.

(56) References Cited

U.S. PATENT DOCUMENTS

| | | | | |
|---|---|---|---|---|
| 4,047,057 A * | 9/1977 | Ahmed | ......................... | 327/176 |
| 6,052,266 A | 4/2000 | Aromin | | |
| 7,242,557 B2 * | 7/2007 | Ward | .............................. | 361/42 |
| 7,319,443 B2 * | 1/2008 | Kimura et al. | .................. | 345/76 |
| 7,916,438 B2 | 3/2011 | Ward | | |
| 2002/0145838 A1 | 10/2002 | Bonilla et al. | | |
| 2012/0229943 A1 * | 9/2012 | Ward | .............................. | 361/62 |
| 2014/0009856 A1 * | 1/2014 | Ward et al. | ...................... | 361/42 |
| 2014/0111891 A1 * | 4/2014 | Ward | .............................. | 361/42 |
| 2014/0340804 A1 * | 11/2014 | Ward | ........................... | 361/115 |

FOREIGN PATENT DOCUMENTS

WO    2008107035 A1    9/2008
WO    2012110279 A1    8/2012

OTHER PUBLICATIONS

European Search Report for European Patent Application No. 13183820.3, mailed Jan. 29, 2014, 5 pages.

* cited by examiner

*Primary Examiner* — Thienvu Tran
*Assistant Examiner* — Angela Brooks
(74) *Attorney, Agent, or Firm* — Withrow & Terranova, P.L.L.C.

(57) ABSTRACT

An electromechanical switching circuit comprises an integrated circuit (IC) having an input terminal, an output terminal and a control terminal. The IC is arranged based on a voltage transition at the control terminal, sampling the voltage level at the input terminal and supplying it at the output terminal. The output voltage level is maintained at the output terminal until a voltage transition at the control terminal. A control circuit connected to the control terminal includes a first monostable switch whose actuation causes a voltage transition at the control terminal so the voltage level applied at the input terminal is supplied at the output terminal. An output circuit includes a second, electromechanical, monostable switch whose contacts are moved to their unstable state in response to a first voltage level at the output terminal and allowed to resume their stable state in response to a second voltage level at the output terminal.

4 Claims, 5 Drawing Sheets

ELECTROMECHANICAL SWITCHING CIRCUIT WITH MEMORY

FIELD OF THE DISCLOSURE

This invention relates to an electromechanical switching circuit with memory.

BACKGROUND

FIG. 1 is a circuit diagram of a known type of electromechanical switch which can be switched between two alternate states, and which can be left indefinitely in either of the two states. In the context of the present invention an electromechanical switch is a type of electrical switch having mechanical contacts operated as a result of changes in an electromagnetic field flowing in a coil, usually a solenoid.

In FIG. 1 the electromechanical switch is a relay comprising a solenoid RLA and associated ganged contacts SW2 which are biased normally-open. The contacts SW2 can be held closed, against the opening bias, by the associated solenoid coil RLA provided that a sufficient current, known as a holding current, passes through the coil RLA. The combination of the solenoid coil RLA and its associated contacts SW2 may be embodied in an electromechanical relay of known type. The contacts SW2 are located in the live L and neutral N conductors of an AC mains supply to a load LD, so that opening the contacts SW2 will disconnect the load LD from the AC supply.

One side of the solenoid RLA is connected to the live conductor L via diode D1 and resistor R1, and the other side of the solenoid is connected to the neutral conductor N via a manually actuable switch SWϕ. A capacitor C1 is connected in parallel with RLA and SWϕ. SWϕ is a mechanically latchable switch which when manually actuated will close and will remain in the closed state until manually actuated again to change it to the open state where it will remain until actuated again. RLA will be de-energized and energised in tandem with the open and closed states of SWϕ, and RLA contacts SW2 will open and close in tandem with the state of RLA and SWϕ.

In FIG. 1, when the AC supply is present, capacitor C1 will charge up via diode D1. However the relay coil RLA will not be energized and the associated contacts SW2 will remain open until SWϕ is manually closed. When SWϕ is closed a current will flow through RLA sufficient to close the load contacts LD and maintain them closed for as long as the switch SWϕ remains latched closed. In the absence of any subsequent actuation of SWϕ, in the event of loss of and subsequent restoration of the AC supply the load contacts SW2 will always revert to their last state, i.e. to the state prevailing immediately prior to the loss of supply. This is because the switch SWϕ is a bistable switch; i.e. its contacts will always remain in their current state until the switch is next actuated.

On the other hand, a monostable switch has just one stable state in that its contacts will normally-be open or normally-closed. For a normally-open device, the switch contacts will be closed when the switch is operated by application of an external force, e.g. manual operation, but they will revert to the open state when the external force is removed. In the absence of an external force, a normally-open switch cannot be used directly to keep a connected load or circuit in a continuously energized state. However such a switch may be used indirectly to achieve this function, as demonstrated in FIG. 2. (In the drawings the same references have been used for the same or equivalent components.)

In FIG. 2, when the AC supply is present, capacitor C1 will charge up via diode D1. However the relay coil RLA will not be energized and its contacts SW2 will remain open until a solid state switch SCR1 is turned on. Switch SW1 is in this case a monostable normally-open type, and when this switch is momentarily held closed SCR1 will turn on and the relay coil RLA will be energized causing its contacts SW2 to close and provide power to the load LD. However, when SW1 is released and opens to its stable state, SCR1 will remain turned on due to the holding current flowing through it from C1 via the relay coil RLA, and the relay will remain energized with its contacts SW2 closed. The coil RLA can be de-energised by momentary closure of a further normally-open monostable switch SW3, which will remove the supply to RLA and also cause SCR1 to turn off. Thus by the use of two normally-open monostable switches SW1 and SW3, relay contacts SW2 can be opened and closed as required.

If the coil RLA were energized and its contacts SW2 closed, and there were a subsequent removal of the AC supply, the contacts SW2 would open due to the removal of current flowing in RLA. However, upon the restoration of the AC supply the contacts SW2 would remain open. It would require the user to operate SW1 to reclose the contacts SW2.

The arrangement of FIG. 1 can therefore be considered to be a circuit with memory in that the relay contacts SW2 will always revert automatically to their previous state on removal of and restoration of the AC supply, whereas the arrangement of FIG. 2 does not have memory in that contacts SW2 will always revert to the open state on removal of and restoration of the AC supply.

Latching (bistable) switches clearly are the preferred choice for applications requiring memory, and these are widely available. However, there are some applications where a latchable switch cannot be used. One example is where a micro switch is placed beneath a plastic membrane. Such membrane type switches are usually operated by applying force via a finger to the membrane directly above the switch. Most standard types of plastic membranes can accommodate only a very limited amount of displacement, e.g. <1 mm, and the switch must change states in response to this limited amount of displacement. In contrast, a latching push type switch will typically require a movement or displacement of >2.5 mm, which is well outside the range of movement achievable with a standard plastic membrane. It would therefore be impractical to use a latching switch under these conditions, and an alternative means must be found to achieve the desired latching switch function with a non-latching switch.

U.S. Pat. No. 7,916,438, which is incorporated herein by reference in its entirety, discloses an electrically latching residual current device comprising a relay whose contacts close automatically on application of a mains supply at or above a certain level. The RCD contacts will open automatically on loss of supply and will reclose automatically on restoration of the supply. The contacts will also open automatically in response to a residual fault current exceeding a certain safe level. In this case the circuit also has means for ensuring that in the event of a loss of supply and restoration of the supply prior to manual resetting of the RCD, the contacts will remain open until intentionally reclosed by the user. This is an important safety feature which prevents the RCD contacts from closing on to a pre-existing fault condition, and is achieved by opening a normally-closed contact in the relay circuit to prevent automatic restoration of the supply current to the relay in the event of the relay being de-energised in response to a fault condition. To this extent, it can be said that this circuit has a built in memory which ensures that the relay reverts to or remains in the state that it was in prior to loss of supply following a fault condition.

However, U.S. Pat. No. 7,916,438 achieves its memory function by the use of an additional electromechanical/electromagnetic means. This presents problems of design complexity, size, cost and user interface in that the resetting mechanism must be accessible to the user. The use of electromechanical or electromagnetic means such as solenoids and relays including permanent magnet relays to achieve the requisite memory function in RCDs and similar products is quite common despite the above mentioned problems because of the absence of an acceptable alternative means to achieve this function.

SUMMARY

It is an object of the invention to provide an electromechanical switching circuit with memory which avoids or mitigates the problems of the prior art.

Accordingly, the present invention provides an electromechanical switching circuit with memory, comprising:

(a) an integrated circuit (IC) having an input terminal (Vin), an output terminal (Vout) and a control terminal (Vadj), the IC being arranged in response to a voltage transition in a particular direction at the control terminal (Vadj) to sample the voltage level applied at the input terminal (Vin) and supply such voltage level at the output terminal (Vout), such output voltage level being maintained at the output terminal until a subsequent voltage transition in said particular direction at the control terminal (Vadj), (b) a control circuit connected to the control terminal (Vadj), the control circuit including a first monostable switch (SW1) whose momentary actuation causes a voltage transition in said particular direction at the control terminal (Vadj) so that the voltage level then applied at the input terminal (Vin) is supplied at the output terminal (Vout), (c) an output circuit including a second, electromechanical, monostable switch (RLA, SW2) whose contacts (SW2) are moved to their unstable state in response to a first voltage level at the output terminal (Vout) and allowed to resume their stable state in response to a second voltage level at the output terminal (Vout), and (d) a feedback connection (100) between the input and output circuits to cause the voltage level applied at the input terminal (Vin) to toggle between said first and second levels in response to consecutive changes of state of said electromechanical switch (RLA, SW2).

In certain embodiments electric power for the circuit is derived from a rectified AC supply, and wherein the electromechanical switch contacts (SW2) are located in the AC supply conductors (L, N) to a load (LD).

In such embodiments, the electromechanical switch contacts (SW2) may be open in their stable state, the switching circuit further comprising means (CT, W1, 10) for detecting a fault in the AC supply and for opening the electromechanical switch contacts (SW2) independently of the operation of the first monostable switch (SW1).

An advantage of the invention is that it provides, at least in certain embodiments, a monostable relay whose contacts have a stable normally open state and an unstable normally closed state which can be made to behave like a bistable relay by control circuitry such that the relay contacts can be set indefinitely to the open or closed states and which, in the event of loss of and restoration of supply, will revert to the state they were in immediately prior to the loss of supply.

A further advantage of such embodiments is that they provide a monostable relay which when supplying a protected circuit or load will switch to the open state in the event of a fault condition and which will remain in the open state on removal and restoration of the supply.

A still further advantage of such embodiments is that the control circuitry monitors and memorises the state (energized or de-energised) of the relay prior to a loss of supply or a fault condition and restores or maintains the relay in its prior state following removal of the fault or restoration of the supply.

BRIEF DESCRIPTION OF THE DRAWINGS

Embodiments of the invention will now be described, by way of example, with reference to the accompanying drawings, in which.

DETAILED DESCRIPTION

Figure 1:
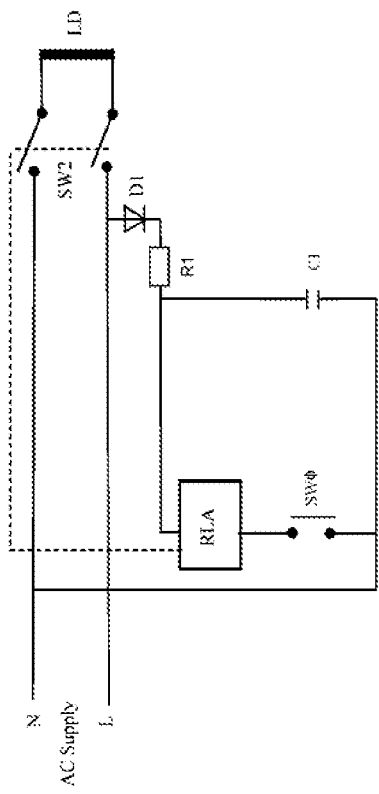
FIG. 1, previously described, is a circuit diagram of an electromechanical switching circuit with memory.
Figure 2:
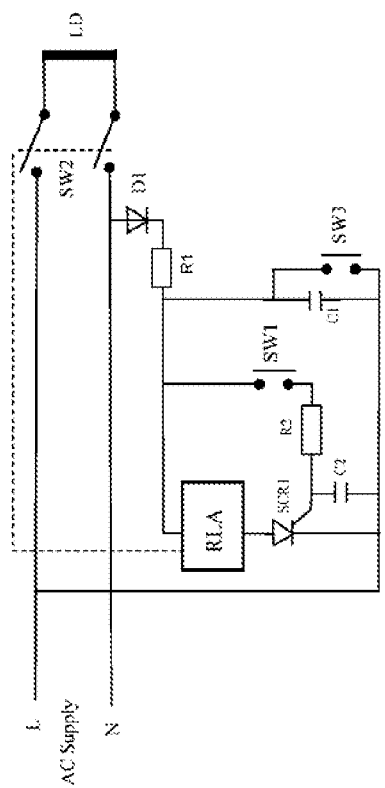
FIG. 2, previously described, is a circuit diagram of an electromechanical switching circuit without memory.
Figure 3:
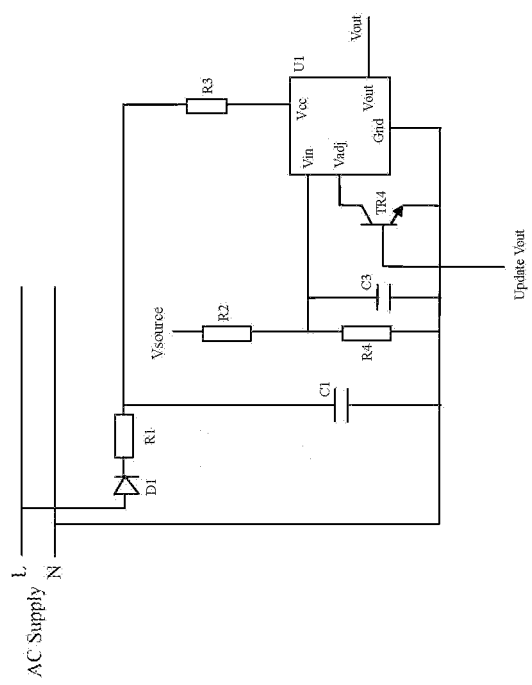
FIG. 3 is a circuit diagram of a switching circuit useful in explaining the operation of the embodiments of the invention.

FIG. 3 shows a simple circuit based on a nonvolatile electronically programmable voltage reference integrated circuit U1. This integrated circuit (IC) is commercially available as DS4303 or DS4305 from Maxim Integrated, San Jose, Calif. 95134 USA, and is normally used to provide a precise voltage reference to electronic circuits. It has a memory in the form of an EEPROM to ensure that the reference voltage stays at a predetermined programmed level.

In FIG. 3, diode D1, resistor R1 and capacitor C1 provide a stable DC voltage supply Vcc to U1. The desired output voltage level at output terminal Vout is initially set at the same voltage level as that at input terminal Vin by the potential divider R2/R4 which is calibrated to derive the desired output from a supply Vsource. This may be Vcc or any stable DC voltage, and C3 minimises ripple or transients at Vin. The voltage level at a control terminal Vadj is normally-held high within the IC, e.g. at Vcc. When a voltage pulse of a certain magnitude and duration is sent to transistor TR4 it will turn on and pull Vadj to ground. This high to low transition at Vadj will cause the EEPROM in U1 to record the voltage level at Vin at that moment, and supply this value to Vout. TR4 will turn off and play no further part in the process. Vin (Vsource) may be removed, but Vout will be maintained at its programmed value regardless. Furthermore, because of the EEPROM memory element, Vout will always assume this programmed value even when the supply is removed indefinitely and subsequently restored. Vout can only be changed by applying a new voltage level to Vin and causing TR4 to turn on momentarily again and supply a subsequent high to low transition at Vadj.

Figure 4:
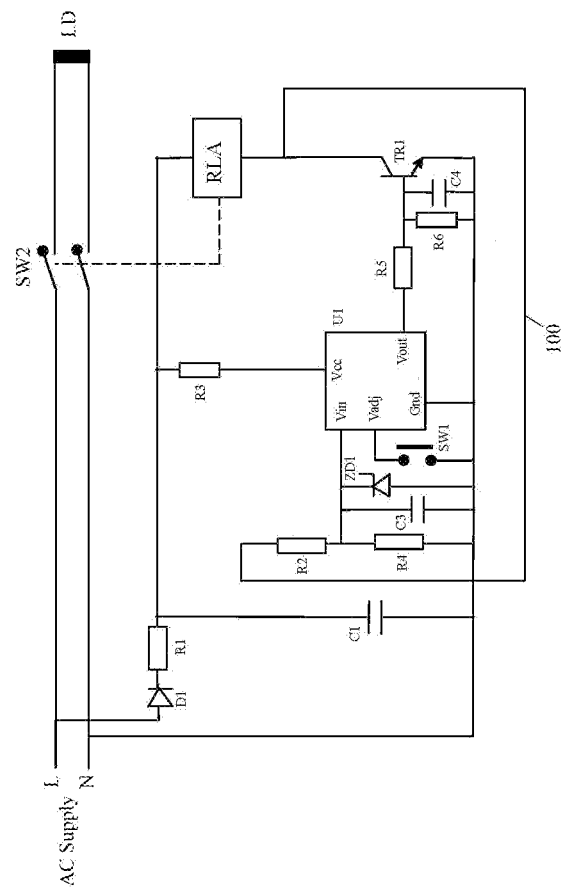
FIG. 4 is a circuit diagram of a first embodiment of the invention.

The present invention exploits these features of the voltage reference IC U1 to provide a memory function to an electromechanical switch. FIG. 4 shows a first embodiment of the invention.

FIG. 4 comprises the components of FIG. 3 with the addition of a relay coil RLA and its associated normally-open contacts SW2 which are used to supply power to a load LD. Supply for the circuit is provided via D1, R1 and C1 as before. TR4 has been replaced by monostable switch SW1 which is biased towards its open (stable) position. Vout is applied to a transistor TR1, and the voltage on the collector of TR1 is fed back via 100 to provide a source voltage to Vin.

When the circuit is first energized (connected to the AC supply), Vout will be low. TR1 will be turned off and its collector voltage will be high. RLA will be de-energised and its contacts SW2 will be open. The voltage on TR1 collector is used as a source voltage for Vin, which is clamped to a certain value by ZD1 to compensate for changes in supply voltage levels.

When SW1 is momentarily actuated (closed), the high to low transition of Vadj will cause the EEPROM to record the status of Vin, which is currently high. The EEPROM then acquires this value and changes Vout to the same value. This will turn on TR1 and cause coil RLA to be energized and close the contacts SW2 to supply the load. The collector of TR1 will now be at a low voltage, and this value will be fed to Vin. Despite the release and consequent opening of SW1 Vout will be held fixed at its currently high level by the EEPROM until the next closure of SW1. When SW1 is next momentarily closed, the high to low transition of Vadj will cause the EEPROM to acquire the current low value of Vin and apply this to Vout. TR1 will turn off, coil RLA will de-energise and its contacts SW2 will open and disconnect the load, and the high collector voltage of TR1 will be fed to Vin. Hence, manual operation of the monostable switch SW1 enables the user to switch RLA between states and to connect or disconnect the load as required. Thus U1 can be used to enable a non-latching switch to switch a relay between states and to latch the relay in either state indefinitely, the feedback connection 100 between the input and output circuits causing the voltage level applied at the input terminal Vin to toggle between high and low levels in response to consecutive changes of state of the relay RLA/SW2. The switch SW1 may therefore be a membrane type switch as previously described. Furthermore, in the event of loss of and subsequent restoration of the AC supply, the relay RLA/SW2 will revert automatically to its state prior to loss of supply. Thus the circuit has a permanent memory of the state of the relay.

Figure 5:
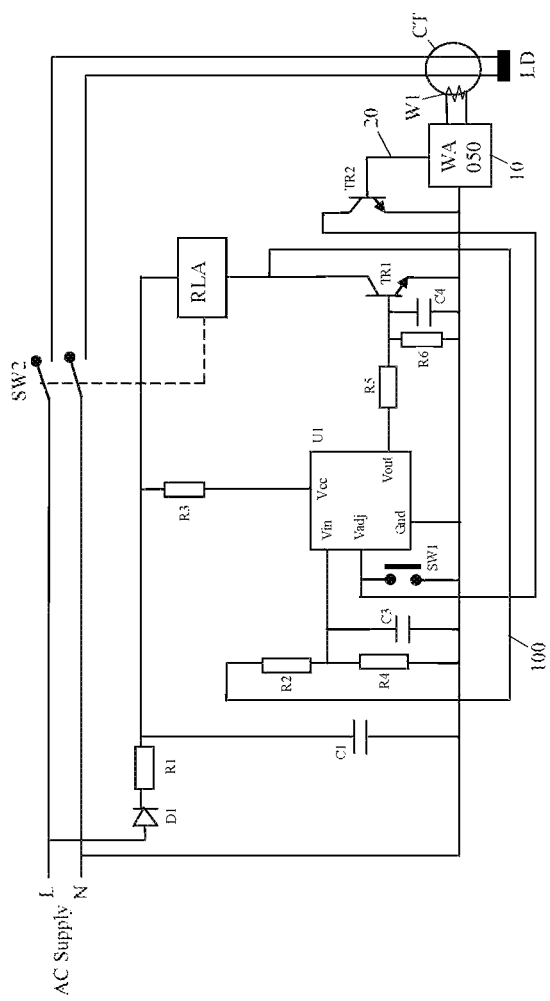
FIG. 5 is a circuit diagram of a second embodiment of the invention.

The arrangement of FIG. 4 can be advantageously applied to an RCD, as shown in FIG. 5.

FIG. 5 comprises substantially the circuit of FIG. 4 with the addition of a residual current device (RCD) integrated circuit 10 which may be a type WA050 supplied by Western Automation Research & Development and described in U.S. Pat. No. 7,068,047, a current transformer CT and a transistor TR2. The behavior of the RCD circuit will be familiar to those versed in the art. Manual operation of SW1 allows the user to switch the load contacts SW2 between states and to connect or disconnect the load LD as previously explained. Assuming that relay contacts SW2 are closed, Vout will be high and Vin will be low. In the event of loss of supply contacts SW2 will initially open but on restoration of the supply SW2 contacts will automatically reclose, thus restoring the load to its previous state on each and every supply failure occurrence. However in the event of a residual current fault, the output 20 of IC 10 will go high, turning on TR2, which will pull Vadj low. This high to low transition will cause the EEPROM to record the state of Vin (which will be low) and to change Vout to this (low) state. This will cause TR1 to turn off, causing RLA contacts SW2 to open and disconnect the load LD in response to the residual current fault condition. The rise in TR1 collector voltage will cause Vin to go to the high state, but coil RLA will remain de-energised, even in the event of loss of supply and restoration of supply under this condition, and will remain de-energised until SW1 is momentarily actuated by the user. Thus the RCD circuit has been provided with a critical safety feature which prevents automatic reconnection of a load to a supply in the event of a residual fault current followed by a subsequent loss of supply and restoration of the supply. The RCD is further provided with manual and automatic means to latch a relay in either of its two states and a memory function which prevents inadvertent or unintentional reconnection of the load to the supply in the event of its disconnection and restoration of the supply.

The circuit can be set by the manufacturer to ensure that SW2 closes automatically when the device is first installed by the user, or that SW2 remains open when the device is first installed and only closes when SW1 is intentionally operated by the user.

Although the IC U1 used in the above embodiments was intended primarily for use as a voltage reference, use of the IC as demonstrated herein enables it to be used as a bistable switch with memory.

Described herein is a simple but effective means of latching an electrically switchable device in either of two states with a non-latching switch and with a memory facility which ensures that the device always remains in or reverts to the state it was in prior to loss of supply and subsequent restoration of the supply.

Additional refinements or uses other than those described herein may be applied without departing materially from the invention. For example, TR1 could be replaced by a Mosfet. Additional components could be added to provide better regulation, control of timing and switching, etc. The circuit could be used in an arc fault detector or in other fault or status detecting circuits. The circuit could be used on DC supplies.

The invention is not limited to the embodiments described herein which may be modified or varied without departing from the scope of the invention.

The invention claimed is:

1. An electromechanical switching circuit with memory, comprising:
    (a) an integrated circuit having an input terminal, an output terminal and a control terminal, the IC being arranged in response to a voltage transition in a particular direction at the control terminal to sample the voltage level applied at the input terminal and supply such voltage level at the output terminal, such output voltage level being maintained at the output terminal until a subsequent voltage transition in said particular direction at the control terminal,
    (b) a control circuit connected to the control terminal, the control circuit including a first monostable switch whose momentary actuation causes a voltage transition in said particular direction at the control terminal so that the voltage level then applied at the input terminal is supplied at the output terminal,
    (c) an output circuit including a second, electromechanical, monostable switch whose contacts are moved to their unstable state in response to a first voltage level at the output terminal and allowed to resume their stable state in response to a second voltage level at the output terminal, and
    (d) a feedback connection between the input and output circuits to cause the voltage level applied at the input terminal to toggle between said first and second levels in response to consecutive changes of state of said electromechanical switch.

2. An electromechanical switching circuit as claimed in claim 1, wherein electric power for the circuit is derived from a rectified AC supply, and wherein the electromechanical switch contacts are located in the AC supply conductors to a load.

3. An electromechanical switching circuit as claimed in claim 2, wherein the electromechanical switch contacts are open in their stable state.

4. An electromechanical switching circuit as claimed in claim 3, further comprising means for detecting a fault in the AC supply and for opening the electromechanical switch contacts independently of the operation of the first monostable switch.

\* \* \* \* \*